US011556533B2

(12) United States Patent
Hartsing et al.

(10) Patent No.: US 11,556,533 B2
(45) Date of Patent: Jan. 17, 2023

(54) METHOD FOR GENERATING VIEWS BASED ON A SEMANTIC MODEL, THAT ALLOWS FOR AUTONOMOUS PERFORMANCE IMPROVEMENTS AND COMPLEX CALCULATIONS

(71) Applicant: Oracle International Corporation, Redwood Shores, CA (US)

(72) Inventors: James Hartsing, Nashua, NH (US); Raghuram Venkatasubramanian, Cupertino, CA (US); Ekrem S. C. Soylemez, Lexington, MA (US); Anne Murphy, Cambridge, MA (US); Scott Feinstein, Orlando, FL (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/096,082

(22) Filed: Nov. 12, 2020

(65) Prior Publication Data

US 2022/0147527 A1 May 12, 2022

(51) Int. Cl.
*G06F 16/2453* (2019.01)
*G06F 16/2455* (2019.01)
(Continued)

(52) U.S. Cl.
CPC .... *G06F 16/24537* (2019.01); *G06F 16/2264* (2019.01); *G06F 16/2282* (2019.01);
(Continued)

(58) Field of Classification Search
CPC ........... G06F 16/24537; G06F 16/2264; G06F 16/2282; G06F 16/24556; G06F 16/2456; G06F 16/283
See application file for complete search history.

(56) References Cited

U.S. PATENT DOCUMENTS 5,897,632 A    4/1999  Dar et al.
5,991,754 A    11/1999 Raitto et al.
(Continued)

OTHER PUBLICATIONS

Live SQL. "Creating Analytic Views—Getting Started", p. 1-22 (Year: 2017).*
Oracle, Database, "Database Data Warehousing Guide" Release 2 (12.2) pp. 1-669 (Year: 2018).*
Rittmanmead, "Metadata Modeling in the Database with Analytic Views", Oracle Database, analytic views, metadata, OBIEE, DVD, Database, Analytic View, Self-Service Reporting, Apr. 3, 2017 15 pages (Year: 2017).*

(Continued)

*Primary Examiner* — Mark D Featherstone
*Assistant Examiner* — Kweku William Halm
(74) *Attorney, Agent, or Firm* — Hickman Becker Bingham Ledesma LLP; Brian N. Miller

(57) ABSTRACT

Herein are techniques for automatically leveraging metadata of an analytic view to accelerate a relational query. In an embodiment, a computer stores model metadata that defines an analytic view that contains a join operation that is based on a dimension column of a dimension table and a join column of a fact table. The analytic view also contains a measure that is based on an aggregation operation and a measure column of the fact table. Also stored is denormalization metadata that defines a transparency view that is based on the analytic view. In operation, a query that references the transparency view is received. The query does not reference the analytic view. The query that references the transparency view is executed based on: a) the denormalization metadata that defines the transparency view, b) the model metadata that defines the analytic view, and c) the measure that is based on the aggregation operation and the measure column of the fact table.

22 Claims, 5 Drawing Sheets

(51) Int. Cl.
*G06F 16/28* (2019.01)
*G06F 16/22* (2019.01)

(52) U.S. Cl.
CPC .... *G06F 16/2456* (2019.01); *G06F 16/24556* (2019.01); *G06F 16/283* (2019.01)

(56) References Cited

U.S. PATENT DOCUMENTS

| | | | |
|---|---|---|---|
| 6,339,769 | B1 | 1/2002 | Cochrane et al. |
| 6,449,605 | B1 | 9/2002 | Witkowski |
| 6,449,606 | B1 | 9/2002 | Witkowski |
| 6,477,536 | B1 | 11/2002 | Pasumansky et al. |
| 7,546,226 | B1 * | 6/2009 | Yeh ................ G06F 16/289 703/2 |
| 8,359,325 | B1 | 1/2013 | Gui et al. |
| 8,510,261 | B1 * | 8/2013 | Samantray ........... G06F 16/254 707/602 |
| 9,146,955 | B2 | 9/2015 | Nos et al. |
| 9,519,701 | B2 | 12/2016 | Amule et al. |
| 9,619,581 | B2 | 4/2017 | Hughes et al. |
| 10,067,954 | B2 | 9/2018 | Kociubes et al. |
| 10,558,659 | B2 | 2/2020 | Hopeman et al. |
| 10,740,333 | B1 * | 8/2020 | Betawadkar-Norwood ............. G06F 16/24556 |
| 2001/0013030 | A1 | 8/2001 | Colby et al. |
| 2004/0122844 | A1 * | 6/2004 | Malloy ............... G06F 16/283 707/999.102 |
| 2004/0139061 | A1 * | 7/2004 | Colossi ............... G06F 16/283 |
| 2005/0144183 | A1 * | 6/2005 | McQuown ........... G06Q 30/02 |
| 2013/0238637 | A1 | 9/2013 | Gupte et al. |
| 2014/0181154 | A1 * | 6/2014 | Amulu ................. G06F 16/28 707/803 |
| 2014/0244690 | A1 * | 8/2014 | Vundavalli ........... G06F 16/21 707/790 |
| 2017/0024435 | A1 * | 1/2017 | Kociubes ........... G06F 16/2453 |
| 2018/0341677 | A1 | 11/2018 | Fan et al. |
| 2022/0092069 | A1 | 3/2022 | Hartsing et al. |

OTHER PUBLICATIONS

Cohen et al., "Rewriting queries with arbitrary aggregation functions using views" ACM Transactions on Database Systems (TODS) (TODS), vol. 31, Issue Jun. 2, 2006, pp. 672-715 https://doi.Org/10.1145/1138394.1138400 (Year: 2006).*

Live SQL. "Creating Analytical Views - Getting Started" p. 1 - 22 (Year: 2017).*

Oracle, Database "Data warehousing Guide" Release 2 )12.2) pp. 1-669 (Year: 2018).*

Rittmanmead, "Metadata Modeling in the Database with Analytic Views", Oracle Database analytical views metadata OBIEE, DVD, Database Analytic View Self-Referencing Reporting Apr. 3, 2017 15 pages (Year: 2017).*

Cohen et al., "Rewriting queries with arbitrary aggregation functions using views" ACM Transactions on Database Systems (TODS), vol. 31 ISSUE Jun. 2, 2006 pp. 672-715 (Year: 2006).*

Rittmanmead, "Metadata Modeling in the Database with Analytic Views", Oracle Database, analytic views, metadata, obiee, DVD, database, analytic view, self-service reporting, Apr. 3, 2017, 15 pages.

Oracle® Database, "Database In-Memory Guide", 12c Release 2 (12.2), dated Jan. 2019, 227 pages.

Oracle® Database, "Database Data Warehousing Guide", 12c Release 2 (12.2), dated Jan. 2018, 699 pages.

Oracle, "Oracle® Database 2 Day + Data Warehousing Guide 11g Release 2 (11.2)", dated Feb. 2012, 130 pages.

Oracle, "Oracle Database In-memory: In-Memory Aggregation", Oracle White Paper, Jan. 2016, 13 pages.

Live SQL, "Creating Analytic Views—Getting Started", dated Jan. 4, 2017, 22 pages.

Fu et al., "CubiST: A New Algorithm for Improving the Performance of Ad-hoc OLAP Queries", dated 2000, 8 pages.

Hartsing, U.S. Appl. No. 17/027,238, filed Sep. 21, 2020, Non-Final Rejection.

* cited by examiner

METHOD FOR GENERATING VIEWS BASED ON A SEMANTIC MODEL, THAT ALLOWS FOR AUTONOMOUS PERFORMANCE IMPROVEMENTS AND COMPLEX CALCULATIONS

RELATED CASES

The following related references are incorporated in their entirety herein:

U.S. patent application Ser. No. 17/027,238 METHOD FOR USING A SEMANTIC MODEL TO TRANSFORM SQL AGAINST A RELATIONAL TABLE TO ENABLE PERFORMANCE IMPROVEMENTS filed Sep. 21, 2020 by James Hartsing et al;

Oracle Database, Database Data Warehousing Guide, PART NO E85643-03, January 2018.

FIELD OF THE INVENTION

The present invention relates to acceleration of multidimensional analytics. Herein are database techniques for automatically leveraging metadata of a hardware-accelerated view to execute a relational query.

BACKGROUND

Online analytical processing (OLAP) provides multidimensional querying such as for reporting, data mining, data science, and business intelligence. Multidimensional axes of OLAP may be classified as (a) dimensions based on dimension tables that provide specification data such as read only data and (b) measures based on fact tables that provide time series data or mutable data such as from online transactional processing (OLTP).

Multidimensional axes may be interrelated such as with primary and foreign key columns specified in a relational schema. Within the relational schema, such interrelations may provide topological patterns such as, in order of increasing complexity, tree, star, and snowflake. A database view may rely on underlying base tables that are logically arranged in those topological patterns. During query execution, relational joins such as equijoins are used to navigate between multiple base tables and according to those topological patterns.

Analytic views (AVs) are database objects that encapsulate a logical business model over a relational model provided by tables and other database views. AV metadata identifies dimensions, hierarchies, and measures, including interrelated columns such as primary and foreign keys. Metadata defined in an AV allows a database system to analyze various topological roles that base tables and columns fulfil in the models. AVs present a fully-solved set of rows and columns such that all aggregations are specified within the AV metadata defining the business model.

Attribute dimension objects are defined on dimension tables to define levels of measurement scale in dimensions and designate columns that demark those levels. Hierarchies are defined on attribute dimensions, defining the parent-child relationship among a set of levels of a same dimension. AVs are defined over a set of attribute dimensions and hierarchies and fact tables, and additionally define measures over numeric fact columns.

AVs can be queried in structured query language (SQL) using AV specific syntax SQL extensions such as in a proprietary SQL dialect. One significant issue with this is that few or none of existing reporting tools generate SQL using AV specific extensions. There is also no expectation that providers of these legacy tools will devote redevelopment resources to use AV specific extensions in the future. Such legacy tools speak in the language of only standard SQL, using GROUP BY and aggregation operators to display aggregate results. A typical query from a legacy reporting tool is of the following example form.

```
SELECT
    <group by columns>,
    <aggr_function1>(<measure column1>),
    <aggr_function2>(<measure column2>),
    ...
    <aggr_functionN>(<measure columnN>)
FROM
    <sources>
[ WHERE <filter before aggregation> ]
GROUP BY
    <group by columns>
```

Whereas a possibly semantically equivalent example AV SQL query instead has the following different form that lacks express aggregation and express grouping.

```
SELECT
    {attributes},
    {base measures defined in AV},
    {calcs defined in AV}
FROM
    {AV} HIERARCHIES ({hierarchies, ...})
    WHERE <filters on hierarchies> ]
```

A technical problem is that leveraging AVs requires that developers manually reauthor and regenerate their legacy queries against the AVs rather than the base tables. Existing legacy installations may include a library of many queries, and modifying all of those queries to utilize AVs may be costly or impractical, especially since AVs and AV components such as measures and dimensions are not part of standard SQL. Legacy client tooling generally cannot use nonstandard SQL extensions needed to access AVs. Thus, AVs are categorically unavailable to legacy tools.

Additionally, an AV may be defined by metadata that contains important schematic details that can be used to accelerate or otherwise optimize execution of the AV. Because queries from legacy tools do not use AVs, execution of those queries do not leverage the acceleration and optimization that the AV and the AV metadata would provide. Thus, legacy queries may be slower than semantically equivalent AV queries. For those reasons, legacy tools may be categorically denied the excellent performance improvements of a modern relational database systems.

DETAILED DESCRIPTION

Figure 1:
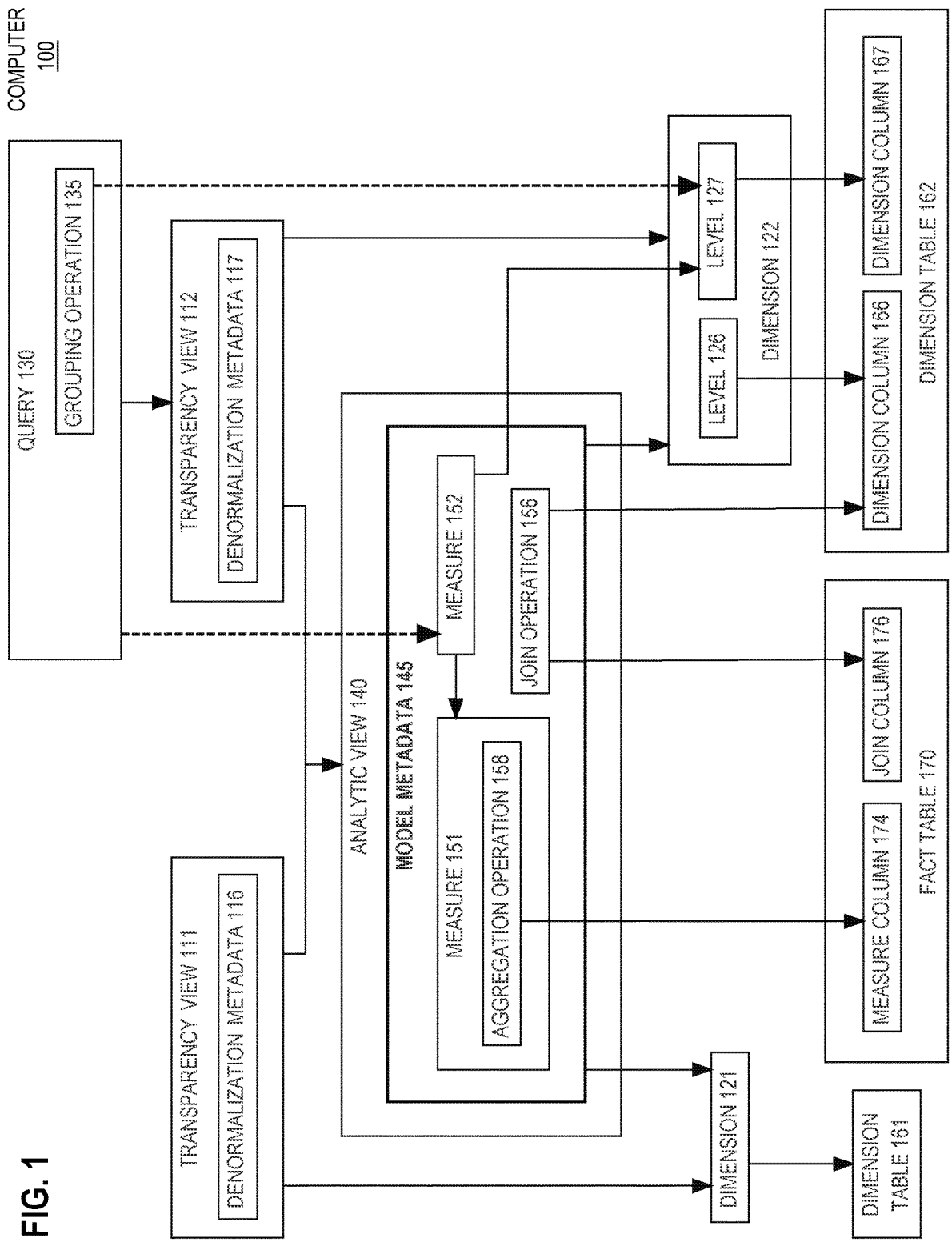
FIG. 1 is a block diagram that depicts an example computer that leverages model metadata of a hardware-accelerated analytic view to execute a query such as a multidimensional relational query for online analytical processing (OLAP)

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein are approaches for acceleration of multidimensional analytics, including database techniques that make a hardware-accelerated view available to a legacy query. Query execution herein not only provides a broader set of legacy tools access to the benefits of multidimensional views known as analytic views (AVs), but does so in a standard structure query language (SQL) compliant way. Acceleration herein of legacy and/or ad hoc queries requires only introduction of an additional layer of database views, known herein as transparency views, and no changes to existing AVs and existing base tables that underlie the AVs.

Techniques herein automatically analyze and seamlessly leverage semantic modeling provided by AVs. For example, Oracle's Autonomous Data Platform autonomously creates AVs that are built over legacy base tables. Transparency views may be created to automatically operate as adapters that mediate between standard SQL queries from legacy tools and AVs that provide content and metadata.

For example, AVs are composed of online analytical processing (OLAP) specifications such as dimensions and OLAP calculations such as measures that are only accessible by directly querying an AV using nonstandard SQL. In other words, client tooling based on standard SQL cannot directly query an AV and thus may be unable to access the measures and dimensions of the AV without innovative techniques herein. Thus, AVs, measures, and dimensions are generally incompatible with standardized client tooling such as legacy SQL tools.

In one scenario, execution of a query that references a transparency view undergoes an analysis phase where the SELECT, GROUP BY, and other SQL clauses in the query are examined to determine if the query can be transformed into an equivalent query that references the AV on which the transparency view is based instead of referencing the transparency view. If that analysis indicates that the transformation can be applied, the query is modified accordingly to query the AV with quantitative aggregations performed within the AV itself. In another scenario and based on automatic inspection of the metadata that defines the AV, query execution bypasses the AV to instead directly access the underlying tables or views on which the AV is defined, in which case the AV might not be involved in the final execution plan. Regardless of whether query execution uses the AV or metadata that defines the AV, the query can then realize all of the acceleration and optimization that other approaches reserve exclusively for nonstandard queries originally crafted for the AV.

Since transparency views provide the same public interface as any other relational view in the system, tools that do not understand the nonstandard logical model of an AV can nonetheless be adapted by the transparency view(s) to leverage the model metadata of the AV for acceleration and optimization. The transparency views present a relational model that, with automation herein, has visibility within and beneath the logical model of AV. That allows users to define new AVs and/or leverage existing AVs to accelerate SQL standard queries from a much larger set of tools and applications than would be possible without transparency views. This includes both acceleration as well as access to reusable calculations, such as measures, that are centrally encapsulated within an AV to avoid mistaken client formulae and avoid diverse and decentralized maintenance.

In an embodiment, execution of a transparency view query that is automatically rewritten to instead reference an AV is treated as a view expansion, except that the view expanded data manipulation language (DML) is dynamically generated. AV implementation logic uses its rich metadata within the context of the query to generate optimal SQL, facilitating maximal leveraging of other database features such as vector transform, group by, and specialized caching as presented herein. The performance benefits of AVs include, but are not limited to:

A metadata-driven (rather than cost driven) approach to vector transform (VT). VT is a cost-based query transform that works on SQL queries that perform joins followed by aggregation. VT uses dense integer identifiers that represent groupings such as for efficient random access into array structures that accumulate aggregations. VT is designed to optimize analytic queries, specifically those typical against a star or snowflake schema. These queries often have a very large fact table joined to one or more small dimension tables, and perform aggregation of fact columns, often grouped by columns from the dimension tables. Typically, there is a very large number of input rows available for aggregation and a small number of output rows such as with subtotaling or rolling up for OLAP. To accurately engage VT in other approaches, the optimizer must correctly identify those characteristics using statistics. Whereas herein, metadata contained in an AV provides precise details of the fact, dimensions, and aggregation, which dramatically eases the optimizer's job in correctly applying VT.

Single pass aggregation. In many cases queries span levels of a hierarchy of a dimension, including cases of calculations such as rolling up and drilling down. With AV implementation logic, the hierarchical work is done in a way that includes optimal aggregation such that multiple rows get aggregated to a single parent item in a higher level, and subsequently aggregation is repeated to levels further up in the same dimension if needed.

Automatic caching of aggregate values and hierarchy structures. The AV tracks accesses based on hierarchy levels and provides the ability to automatically identify and cache frequently accessed areas of the aggregate space.

Optimized access of remote data. When the AV is mapped over remote tables in other databases and/or hosts, such as through a database symbolic link, AV implementation logic detects when it is more efficient to use data locally cached or push joins and aggregation to the source database.

In an embodiment, a computer stores model metadata that defines an analytic view that contains a join operation that is based on a dimension column of a dimension table and a join column of a fact table. The analytic view also contains a measure that is based on an aggregation operation and a measure column of the fact table. Also stored is denormalization metadata, as explained later herein, that defines a transparency view that is based on the analytic view. In operation, a query that references the transparency view is received. The query does not reference the analytic view. The query that references the transparency view is executed based on: a) the denormalization metadata that defines the transparency view, b) the model metadata that defines the analytic view, and c) the measure that is based on the aggregation operation and the measure column of the fact table. For example, a measure column may store revenue data for which a measure defines various ways of subtotaling. Model metadata of an analytic view may be used to automatically configure data structures that accelerate and/or cache subtotals. As presented herein, denormalization metadata of a transparency view may provide a standard SQL query, which is otherwise incompatible with analytic views and measures, access to such predefined acceleration and caching.

1.0 Example Computer

FIG. 1 is a block diagram that depicts an example computer 100, in an embodiment. Computer 100 leverages model metadata 145 of hardware-accelerated analytic view 140 to execute example query 130 such as a multidimensional relational query for online analytical processing (OLAP). Computer 100 may be at least one rack server such as a blade, a personal computer, a mainframe, a virtual computer, or other computing device. When computer 100 comprises multiple computers, the computers are interconnected by a communication network.

Computer 100 provides access to a database (not shown) that is a bulk datastore such as a relational database. The database may be managed by software such as an application or middleware such as a database management system (DBMS). Data stored in the database may reside in volatile and/or nonvolatile storage.

A relational schema of a database may have a logical arrangement of tables that is generally flat such that any table may be directly related to any other table such as by foreign key. Computer 100 instead has a logically layered arrangement of database components that consist of four layers shown as a vertical stack as follows. The lowest layer consists of a relational schema that contains tables such as 161-162 and 170.

1.1 Multilevel Dimension

Immediately above the bottom relational layer is a dimension layer that consists of dimensions such as 121-122 that have mutually exclusive ranges of discrete values. Each dimension delegates persistence to a respective dimension table. For example, dimension 121 may enumerate products for sale, and dimension table 161 may be operated as a persistent catalog of products such as blue shirts, green shirts, and blue coats.

A dimension may impose a hierarchy of multiple levels that are units of measurement. For example, dimension 122 may be time, and levels 126-127 may respectively be days and years. Each level of a dimension delegates persistence to a respective dimension column in a dimension table. For example, dimension column 167 may be operated as a persistent catalog of years such as 2000-2025.

The following example dimension script has two example data definition language (DDL) statements that cooperate to define an example multilevel dimension. Elements of this dimension script shown in bold may occur in FIG. 1 as follows. Dimension 122 may be "time_attr_dim". Dimension table 162 may be "time_dim". Dimension column 167 may be "year_id". Level 127 may be "YEAR".

```
CREATE OR REPLACE ATTRIBUTE DIMENSION time_attr_dim
USING time_dim
ATTRIBUTES
   (year_id,
   year_name,
   year_end_date,
   quarter_id,
   quarter_name,
   quarter_end_date,
   month_id,
   month_name,
   month_long_name,
   month_end_date)
LEVEL MONTH
   KEY month_id
   MEMBER NAME month_name
   MEMBER CAPTION month_name
   MEMBER DESCRIPTION month_long_name
   ORDER BY month_end_date
   DETERMINES (quarter_id)
LEVEL QUARTER
   KEY quarter_id
   MEMBER NAME quarter_name
   MEMBER CAPTION quarter_name
   MEMBER DESCRIPTION quarter_name
   ORDER BY quarter_end_date
   DETERMINES (year_id)
LEVEL YEAR
   KEY year_id
   MEMBER NAME year_name
   MEMBER CAPTION year_name
   MEMBER DESCRIPTION year_name
   ORDER BY year_end_date;
CREATE OR REPLACE HIERARCHY time_hier
USING time_attr_dim
   (month CHILD OF
   quarter CHILD OF
   year);
```

Dimension tables store specification data that is more or less immutable. For example such as with online transaction processing (OLTP), a transaction to purchase a particular product on a particular day does not change the content of dimension tables 161-162. Whereas content of fact tables such as 170 may evolve. For example, fact table 170 may record purchases that each cause insertion of a new row into fact table 170.

1.2 Analytic View and Measure

Immediately above the dimension layer is an analytic layer consisting of analytic views that are unmaterialized. For example, querying analytic view 140 may sometimes require retrieving content from underlying tables 161-162 and/or 170. Two aspects of analytical views that facilitate OLAP are topology and measures. A measure is a calculation based on a measure column of a fact table. A measure is more or less a column defined and projected by analytic view 140 to provide a calculated aggregate value derived from a measure column, such as for subtotaling. For example, analytic view 140 is based on model metadata 145 that defines measure 151 that applies aggregation operation 158, possibly implied, to measure column 174. For example, aggregation operation 158 may by default be summation such as to total all revenue from all sales. Later herein is a detailed discussion of analytic views.

A measure calculation is reusable across a variety of contexts such as with a multilevel dimension. For example in one case as discussed above, measure 151 can total all revenue from all sales. In another case that groups by calendar quarter, measure 151 subtotals revenue by quarter. If grouping is instead by month, measure 151 subtotals revenue by month. Analytic view 140 may contain measures with complicated calculations. For example, measure 152 is based on measure 151 and level 127 of dimension 122 as explained later herein.

With caching of facts and/or measure results, OLAP activities such as rolling up or drilling down are accelerated. With horizontal partitioning of fact table 170 by dimension 122, especially by finer levels of dimension 122 such as hour or day, drilling down is accelerated and, with elastic or inelastic horizontally scaled task parallelism, rolling up is accelerated. With or without partitioning, rolling up or drilling down are accelerated by data parallelism such as with single instruction multiple data (SIMD) of an instruction set architecture (ISA).

Determining when and how to apply those various OLAP accelerations may be based on analysis of model metadata 145 and its components such as measure 151 and aggregation operation 158. In that way, querying analytic view 140 may be faster than semantically equivalent direct querying of underlying tables 161-162 and 170 as discussed in related U.S. patent application Ser. No. 17/027,238, METHOD FOR USING A SEMANTIC MODEL TO TRANSFORM SQL AGAINST A RELATIONAL TABLE TO ENABLE PERFORMANCE IMPROVEMENTS.

1.3 OLAP Topology

Unlike a relational view that provides only tabular data, analytic view 140 may logically arrange data in a more complex topology such as a star or snowflake based on fact tables and dimension tables and as configured in model metadata 145 that defines analytic view 140. For example, model metadata 145 may be stored in a database dictionary of the database.

For example, model metadata 145 may specify a star topology such that a row of fact table 170 is joined to a row of each of dimension tables 161-162. Such joins are specified by join operations such as 156 that model metadata 145 defines. For example, join operation 156 specifies an equi-join that uses dimension column 166 as a primary key and join column 176 as a foreign key.

The following example analytic view script has an example DDL statement that defines an example analytic view. Although this analytic view script defines an analytic view that is based on only one dimension and only one fact table and has only one measure, another analytic view may be based on multiple dimensions and multiple fact tables and have multiple measures. Executing the above dimension script is a prerequisite of this analytic view script.

Elements of this analytic view script shown in bold may occur in FIG. 1 as follows. Analytic view 140 may be "sales_av". Fact table 170 may be "sales_fact". Join operation 156 may be "REFERENCES" such that both columns 166 and 176 are named "month_id". In an embodiment not shown, the "time_attr_dim KEY month_id REFERENCES" clause does not directly indicate dimension column 166, but instead indicates level 126 that is an alias for dimension column 166.

Measure 151 may be "sum_sales". By default, aggregation operation 158 may be summation. Measure column 174 may be "sales". Measure 152 may be "sales_year_ago". As discussed above, measure 152 is based on measure 151 and level 127 of dimension 122. Specifically, "sales_year_ago" provides monthly sales subtotals for a year ago such as for year-on-year comparison to current monthly subtotals.

```
CREATE OR REPLACE ANALYTIC VIEW sales_av
USING sales_fact
DIMENSION BY
   (time_attr_dim
      KEY month_id REFERENCES month_id
      HIERARCHIES (
         time_hier DEFAULT)
   )
MEASURES
   (sum_sales FACT sales,
    sales_year_ago AS (LAG(sum_sales) OVER (HIERARCHY
       time_hier OFFSET 1 ACROSS ANCESTOR AT LEVEL year))
FACT COLUMNS (sales);
```

1.4 Transparency View, Denormalization, and Compatibility

Immediately above the analytic layer is a transparency layer consisting of so-called transparency views such as 111-112. Denormalization is needed because analytic view 140 may have an exotic multi-fact and/or multidimensional topology such as a star or snowflake that is incompatible with standard structured query language (SQL). For example, direct querying of analytic view 140 may entail proprietary keywords with exotic semantics for an OLAP topology.

For example, measures 151-152 and dimensions 121-122 are accessible by directly querying analytic view 140 using nonstandard SQL. In other words, client tooling based on standard SQL cannot directly query analytic view 140 and thus may be unable to access measures 151-152 and dimensions 121-122 without innovative techniques herein. Analytic view 140 and measures 151-152 and dimensions 121-122 are generally incompatible with standardized client tooling such as legacy tools.

For example, analytic view 140, measures 151-152, and dimensions 121-122 are invisible to a legacy tool that discovers only tables and SQL-standard relational views as database objects in a database dictionary. Even if the legacy tool could discover analytic view 140, measures 151-152, and dimensions 121-122, the legacy tool would not understand the definition of those database objects and thus still could not use analytic view 140, measures 151-152, and dimensions 121-122. In that way, analytic view 140, measures 151-152, and dimensions 121-122 are opaque and without transparency needed by the legacy tool.

That problem of incompatibility due to lack of transparency is solved with transparency views 111-112 that are novel and seamless adapters that can mediate between a legacy tool and analytic view 140 as follows. A transparency view is based on one analytic view. Multiple transparency views may be based on a same analytic view.

Analytic view 140 may be based on one or more dimensions and one or more fact tables. Whereas a transparency view may be based on one or more dimensions and/or one or more fact tables. For demonstration, example transparency views herein are based on: a) one fact table and zero or more dimensions, or b) one dimension. For example, a transparency view may be based on: a) a fact table but no dimensions, or b) a dimension but no fact tables.

Likewise for a same analytic view, multiple transparency views may be based on a same fact table or a same dimension. For example for a same analytic view, there may be multiple transparency views that are based on a same fact table such that: a) a first transparency view is further based on one dimension, b) a second transparency view is instead further based on a different dimension or both dimensions, and c) a third transparency view is not based on any dimension. Thus, different transparency views provide different denormalizations of a same OLAP star topology of a same multidimensional analytic view.

1.5 Transparency View Creation

Herein there are two ways of creating a transparency view. One way entails a DDL CREATE statement as discussed later herein. Another way is to invoke a stored procedure in a database that automatically generates the DDL CREATE statement. The DDL CREATE statement specifies denormalization metadata with which to define a transparency view based on an analytic view. For example, denormalization metadata 116-117 respectively define transparency views 111-112 based on analytic view 140.

As explained earlier herein, a transparency view may or may not be based on a fact table. Which stored procedure is used to generate a DDL CREATE statement to create a transparency view depends on whether or not the transparency view is based on a fact table. The following is an example signature of a dimension transparency view procedure that generates and executes a DDL CREATE statement to create a transparency view that is not based on a fact table.

```
PROCEDURE create_view_for_star_rows(
    analytic_view_name          IN VARCHAR2,
    view_name                   IN VARCHAR2,
    dim_name                    IN VARCHAR2,
    analytic_view_owner_name    IN VARCHAR2 DEFAULT
SYS_CONTEXT('USERENV', 'CURRENT_SCHEMA'),
    view_owner_name             IN VARCHAR2 DEFAULT
SYS_CONTEXT('USERENV', 'CURRENT_SCHEMA'));
```

The following example dimension transparency view creation script invokes procedure "create_view_for_star_rows" twice to create two transparency views respectively based on a "PRODUCT" dimension and a "TIME" dimension of a same analytic view "SALES_AV".

```
create_view_for_star_rows(
'SALES_AV', 'PRODUCT', 'PRICE_COST_PRODUCT_STAR_ROWS_VIEW');
create_view_for_star_rows(
'SALES_AV', 'TIME', 'PRICE_COST_TIME_STAR_ROWS_VIEW');
```

The above invoking of procedure "create_view_for_star_rows" for the multilevel "TIME" dimension generates the following time transparency view DDL CREATE statement. For example: a) "TIME" may be multilevel dimension 122, and b) the following time transparency view DDL CREATE statement may specify denormalization metadata 117 on which transparency view 112 is based.

In the above time transparency view DDL CREATE statement, the "STAR ROWS" clause is a novel way to present dimension content as tabular rows such as for processing by legacy tooling as if the rows were produced by a SQL-standard relational view. Thus even though the time transparency view DDL CREATE statement and its created transparency view are nonstandard, a legacy tool may discover and query the transparency view in a same way as any SQL-standard relational view. Because the transparency view provides legacy-compatible access to content, calculations, and accelerations of an underlying analytic view that has nonstandard components such as measures, dimensions, and an exotic OLAP topology such as a star, the transparency view effectively connects legacy tooling with the full power of analytic views as discussed herein. Other transparency views that may be more practical, such as based on a fact table, are presented later herein.

1.6 Querying Transparency View

In operation, a client such as a legacy tool may submit a query that expressly references transparency view(s). For example, query 130 may be standard SQL that references transparency view 112 in a same way as any SQL-standard relational view may be queried. As discussed later herein and although query 130 may or may not only reference transparency view 112, execution of query 130 may be based on any of: transparency view 112, denormalization metadata 117, analytic view 140, model metadata 145, measures 151-152, operations 156 and 158, dimensions 121-122, and tables 161-162 and 170.

As explained earlier herein: a) one transparency view may be based on a fact table, b) another transparency view may be based on a dimension, and c) a same standard SQL query may reference both transparency views. The following example query, although possibly generated by a legacy tool that understands neither transparency views nor analytic views, nonetheless references a dimension transparency view "t" and a fact transparency view "f" as if both transparency views were SQL-standard relational views.

```
CREATE OR REPLACE FORCE EDITIONABLE VIEW "SALES_AV_TIME_VIEW"
    ("MONTH_ID", "MONTH_NAME", "MONTH_LONG_NAME", "MONTH_END_DATE",
"QUARTER_ID", "QUARTER_NAME", "QUARTER_END_DATE", "YEAR_ID",
"YEAR_NAME", "YEAR_END_DATE") AS
    (
SELECT
    "TIME"."TIME_HIER"."MONTH_ID",
    "TIME"."TIME_HIER"."MONTH_NAME",
    "TIME"."TIME_HIER"."MONTH_LONG_NAME",
    "TIME"."TIME_HIER"."MONTH_END_DATE",
    "TIME"."TIME_HIER"."QUARTER_ID",
    "TIME"."TIME_HIER"."QUARTER_NAME",
    "TIME"."TIME_HIER"."QUARTER_END_DATE",
    "TIME"."TIME_HIER"."YEAR_ID",
    "TIME"."TIME_HIER"."YEAR_NAME",
    "TIME"."TIME_HIER"."YEAR_END_DATE",
FROM "SALES_AV"
    STAR ROWS DIMENSION "TIME"
)
```

```
SELECT
    t.year_name AS time,
    SUM(f.fact_sales) AS sales
FROM
    sales_av_time_view t,
    sales_av_fact_view f
WHERE
    t.month_id = f.time_month_id AND
    t.year_name IN ('CY2014','CY2015')
GROUP BY
    t.year_name
ORDER BY
    t.year_end_date;
```

Assuming query 130 is the above example query, query 130 may contain: a) grouping operation 135 such as the above SQL GROUP BY clause that groups by year, and b) a SUM( ) invocation that subtotals by month. Thus as discussed later herein, query 130 may expressly and/or impliedly use various levels such as 126-127 of same dimension 122 for various respective purposes. Although OLAP components such as measures, dimensions, and levels are not actually contained in a transparency view, the transparency view nonetheless provides aliases to those components.

For example: a) level 127 may be a first alias for dimension column 167, b) analytic view 140 may provide a second alias of level 127, and c) transparency view 112 may provide a third alias of the second alias, which query 130 may reference. Reference of aliases by query 130 are shown as dashed downward arrows, meaning that query 130 is not actually expressly and directly accessing OLAP components in layers beneath transparency view 112 such as measure 152 and level 127. As discussed later herein, how such aliases are actually executed depends on optimizations based on novel uses of view metadata such as 117 and 145.

For example if analytic view 140 caches dimension 122 in memory, then an optimized plan for query 130 may cause grouping operation 135 to bypass transparency view 112 and directly access level 127, regardless of whether or not other parts of the plan for query 130 still use transparency view 112. Likewise, plan optimization may instead cause grouping operation 135 to bypass both of views 112 and 140 and directly access dimension column 167. Various metadata-based optimizations are presented later herein and in related U.S. patent application Ser. No. 17/027,238, METHOD FOR USING A SEMANTIC MODEL TO TRANSFORM SQL AGAINST A RELATIONAL TABLE TO ENABLE PERFORMANCE IMPROVEMENTS.

1.7 More Transparency Views

As explained earlier herein, a transparency view may or may not be based on a fact table, and which stored procedure is used to generate a DDL CREATE statement to create a transparency view depends on whether or not the transparency view is based on a fact table. The following is an example signature of a fact transparency view procedure that generates and executes a DDL CREATE statement to create a transparency view that is based on a fact table.

```
PROCEDURE create_view_for_fact_rows(
    analytic_view_name      IN VARCHAR2,
    view_name               IN VARCHAR2,
    dim_name_seq            IN ID_SEQUENCE DEFAULT NULL,
    analytic_view_owner_name IN VARCHAR2 DEFAULT
SYS_CONTEXT('USERENV', 'CURRENT_SCHEMA'),
    view_owner_name         IN VARCHAR2 DEFAULT
SYS_CONTEXT('USERENV', 'CURRENT_SCHEMA'),
    dim_qual_sep            IN VARCHAR2 DEFAULT '_',
    all_join_keys           IN BOOLEAN DEFAULT TRUE,
    include_meas            IN BOOLEAN DEFAULT FALSE)
```

In an embodiment, procedure "create_view_for_fact_rows" expects an analytic view to be based on only one fact table, which also means that all of the measures in the analytic view are based on a same fact table. The following example invocation of procedure "create_view_for_fact_rows" creates a transparency view based on that sole fact table of analytic view "SALES_AV".

```
create_view_for_fact_rows(
    'SALES_AV', 'PRICE_COST_FACT_ROWS_VIEW',
    dbms_hierarchy.id2_sequence( ));
```

The above invoking of procedure "create_view_for_fact_rows" for that sole fact table, "FACTS" in bold below, of the analytic view generates the following fact transparency view DDL CREATE statement.

```
CREATE OR REPLACE FORCE EDITIONABLE VIEW "SALES_AV_FACT_VIEW" (
"FACT SALES") AS
(
SELECT
    FACTS$."SALES" "FACT_SALES",
FROM "SALES_AV"
    FACT ROWS
)
```

In the above fact transparency view DDL CREATE statement, the "FACT ROWS" clause is a novel way to present fact content as tabular rows such as for processing by legacy tooling as if the rows were produced by a SQL-standard relational view. Thus even though the fact transparency view DDL CREATE statement and its created transparency view are nonstandard, a legacy tool may discover and query the transparency view in a same way as any SQL-standard relational view.

As explained earlier herein, a transparency view may be based on both of a fact table and one or more dimensions.

The following example invocation of procedure "create_view_for_fact_rows" creates a transparency view based on a fact table and a "TIME" dimension.

```
create_view_for_fact_rows(
  'SALES_AV','PRICE_COST_FACT_ROWS_VIEW',
  dbms_hierarchy.id2_sequence(
    dbms_hierarchy.ID2('TIME','ROLLUP')));
```

The above invoking of procedure "create_view_for_fact_rows" generates the following fact transparency view DDL CREATE statement for rolling up sales revenue by month.

```
CREATE OR REPLACE FORCE EDITIONABLE VIEW "SALES_AV_FACT_VIEW" (
"FACT_SALES","TIME_MONTH_ID") AS
  (
SELECT
  FACTS$. "SALES" "FACT_SALES",
  "TIME"."TIME_HIER"."MONTH_ID" "TIME_MONTH_ID"
FROM "SALES_AV"
  FACT ROWS
)
```

2.0 Example Transparency View Processing

Figure 2:
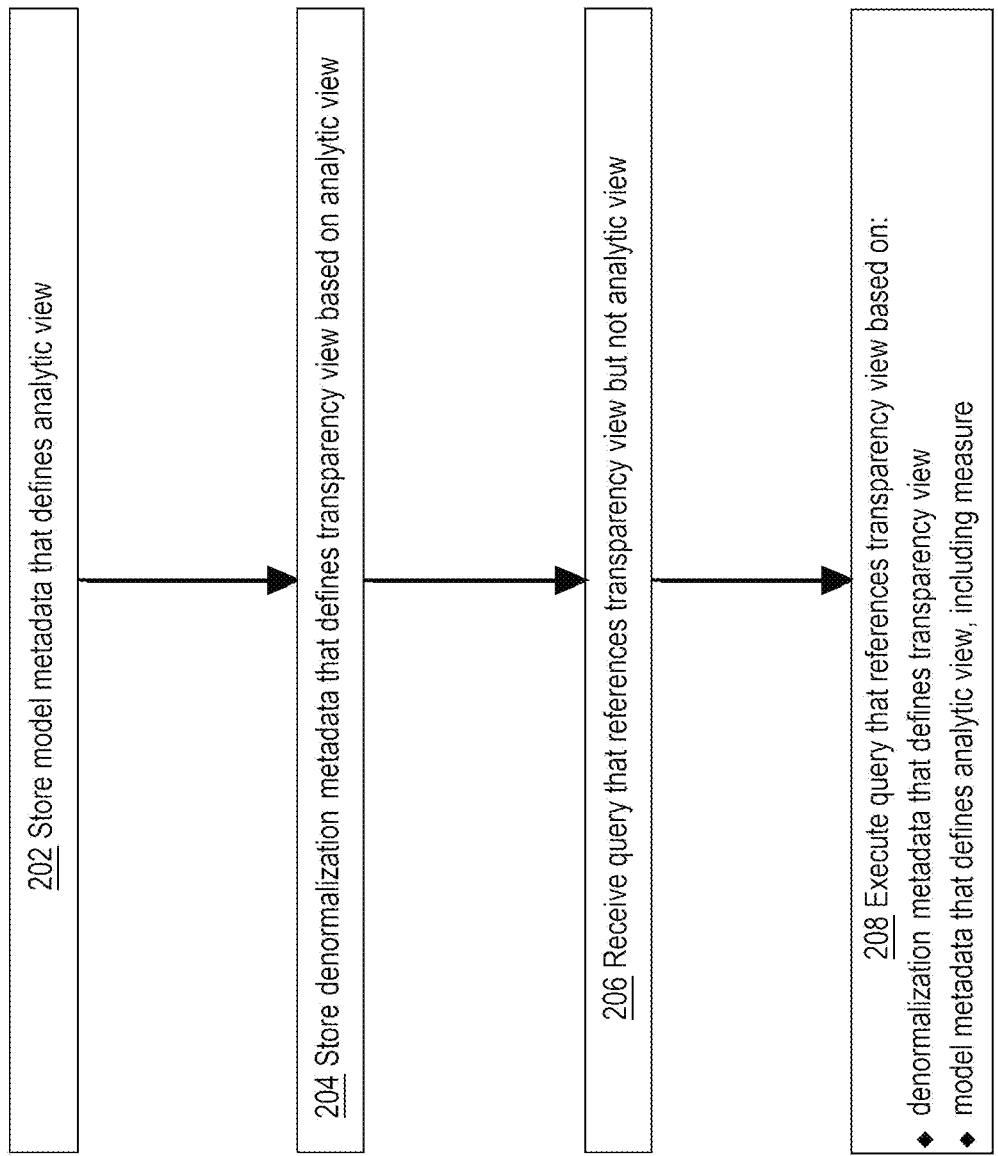
FIG. 2 is a flow diagram that depicts an example process that leverages model metadata of a hardware-accelerated analytic view to execute a query such as a multidimensional relational query for OLAP.

FIG. 2 is a flow diagram that depicts an example process that computer 100 may perform to leverage model metadata 145 of analytic view 140 to execute example query 130 such as a multidimensional relational query for OLAP. FIG. 2 is discussed with reference to FIG. 1.

The process of FIG. 2 occurs in two phases. In a preparatory phase, steps 202 and 204 stores, such as in a database dictionary, view metadata 116-117 and 145 that are needed to create and operate views 111-112 and 140. In a runtime phase, steps 206 and 208 execute and accelerate query 130 by using any of view metadata 116-117 and 145 and views 111-112 and 140 and database objects that views are based on or contain.

Within a database during administration, step 202 stores model metadata 145 that defines analytic view 140, including metadata that defines and/or references database objects such as measures 151-152, operations 156 and 158, dimensions 121-122, and tables 161-162 and 170. For example, a DBA or a DBMS itself may submit a DDL CREATE statement to create analytic view 140. Several other DDL CREATE statements may necessarily precede a CREATE ANALYTIC VIEW statement such as follows. For example, step 202 may execute a DDL script that has various DDL CREATE statements that finally include a CREATE ANALYTIC VIEW statement that references and integrates schematic objects generated by the preceding DDL CREATE statements.

As explained earlier herein, multidimensional axes of OLAP may be classified as measures or dimensions. Each dimension used by an analytic view should preexist the analytic view such as by a respective CREATE ATTRIBUTE DIMENSION statement. To define each measure, the CREATE ANALYTIC VIEW statement may have a respective MEASURE clause that expressly or impliedly by default specifies an aggregation operation such as 158 for measurement mathematics such as SQL COUNT, COUNT DISTINCT, AVG, MAX, and SUM, especially for a measure column of a fact table.

In step 202, the DDL CREATE statements expressly or impliedly by default may specify various organizing operations to be applied to tables 161-162 and 170 as discussed earlier herein. For example, an organizing operation may be configured to fulfil a SQL JOIN such as join operation 156 as discussed earlier herein.

Rich analytic view topologies such as tree, star, or snowflake are composed of spokes or branches that may each be connected by a respective REFERENCES clause in the CREATE ANALYTIC VIEW statement. For example, such a REFERENCES clause may expressly or impliedly by default specify a join operation such as 156 with join columns such as 166 and 176 as details of a relational join, especially for joining a fact table with a dimension table. Detailed approaches for defining and invoking an analytic view are presented in related non-patent literature (NPL) DATABASE DATA WAREHOUSING GUIDE, Part No E85643-03.

Step 204 stores denormalization metadata 116-117 that define transparency views 111-112 based on analytic view 140. For example, stored procedures discussed earlier herein may be invoked to generate and execute DDL statements that specify denormalization metadata 116-117 and that create transparency views 111-112. Unlike other approaches that may expect client tools to embody knowledge needed to negotiate analytic view 140, step 204 instead stores denormalization metadata 116-117 in the database, such as in a database dictionary. Thus, denormalization activities discussed herein are centrally configured and operated within a DBMS, and classic administration problems such as diverse and decentralized maintenance and defective client tooling are avoided.

During or after steps 202 and 204, computer 100 may, in the foreground or background and eagerly or deferred, analyze view metadata 116-117 and 145 to select optimizations that may accelerate operation of views 111-112 and 140. Selecting optimizations is immediately or eventually followed by generation and population of various optimization data structures such as indices and memory caches that may eventually be used to accelerate execution of a query. Various hardware and software optimizations that are based on view metadata are discussed in related U.S. patent application Ser. No. 17/027,238, METHOD FOR USING A SEMANTIC MODEL TO TRANSFORM SQL AGAINST A RELATIONAL TABLE TO ENABLE PERFORMANCE IMPROVEMENTS.

At runtime, step 206 receives query 130 that references transparency views 111 and/or 112 but does not reference analytic view 140. For example and although analytic view 140 preexists runtime submission of query 130, query 130 may be a legacy query such that query 130 was composed, or logic that generates query 130 was developed, before analytic view 140 was created. In any case, query 130 expressly references various aliases provided by the transparency view(s), as discussed earlier herein.

In some cases, query 130 additionally specifies various calculations such as SUM( ) and/or organizing operations such as joins and/or grouping operation 135 that are identical, similar, or at least compatible with calculations such as measures 151-152 and/or organizing operations such as join operation 156 that are specified in model metadata 145 that defines analytic view 140. An example of a non-identical but compatible and somewhat similar organizing operation may be when both of query 130 and analytic view 140 specify a respective group by such that one group by specifies a subset of organizing columns of the other group by.

In any case and as discussed later herein, computer 100 detects, based on view metadata 116-117 and 145, which portions of query 130: a) may be accelerated by bypassing transparency views 111-112 to directly access analytic view 140 and its OLAP components such as measures 151-152 and dimensions 121-122, b) may be accelerated by further bypassing analytic view 130 to directly access tables 161-162 and 170, and/or c) should access transparency views 111-112 as specified by query 130. Which of those strategies (a)-(c) are applied to which portions of query 130 may greatly narrow the variety of query plans that a runtime optimizer may generate. Thus optimizer overhead such as latency may be mostly avoided as discussed in related U.S. patent application Ser. No. 17/027,238, METHOD FOR USING A SEMANTIC MODEL TO TRANSFORM SQL AGAINST A RELATIONAL TABLE TO ENABLE PERFORMANCE IMPROVEMENTS.

Step 208 execute query 130 that references transparency views 111 and/or 112 based on any of: transparency view 112, denormalization metadata 117, analytic view 140, model metadata 145, measures 151-152, operations 156 and 158, dimensions 121-122, and tables 161-162 and 170. As discussed later herein, step 208 may or may not entail rewriting query 130 to include optimizations such as optimizer hints and bypassing views such as by dereferencing aliases such as for increased semantics provided by model metadata 145.

An example of increased semantics entails bypassing transparency view 112 to directly access model metadata 145 and/or metadata that defines dimensions 121-122 such as to detect that months roll up into years. For example, neither transparency views 111-112 nor their denormalization metadata 116-117 reveal that months roll up into years. For example, OLAP activities such as rolling up and drilling down may be accelerated when a relative ordering of levels 126-127 of same dimension 122 is discoverable during planning and/or rewriting of query 130. For example, cached month subtotals may be summed to accelerate calculation of a year total without accessing measure column 174.

Step 208 may include sending a response that answers query 130. For example, the response may be serialized according to SQL and/or ODBC as a scalar value or a result set of row(s), depending on the nature of query 130. No matter what optimizations are engaged, no matter which of view metadata 116-117 are used and how, and no matter which of views 111-112 and 140 are bypassed, the response and logical affect of executing query 130 is identical or semantically equivalent. For example, repeated submissions and executions of same query 130 may generate different respective query plans but always generate same or equivalent results. That is, the observable effect of techniques herein is primarily acceleration.

3.0 Example Acceleration Activities

Figure 3:
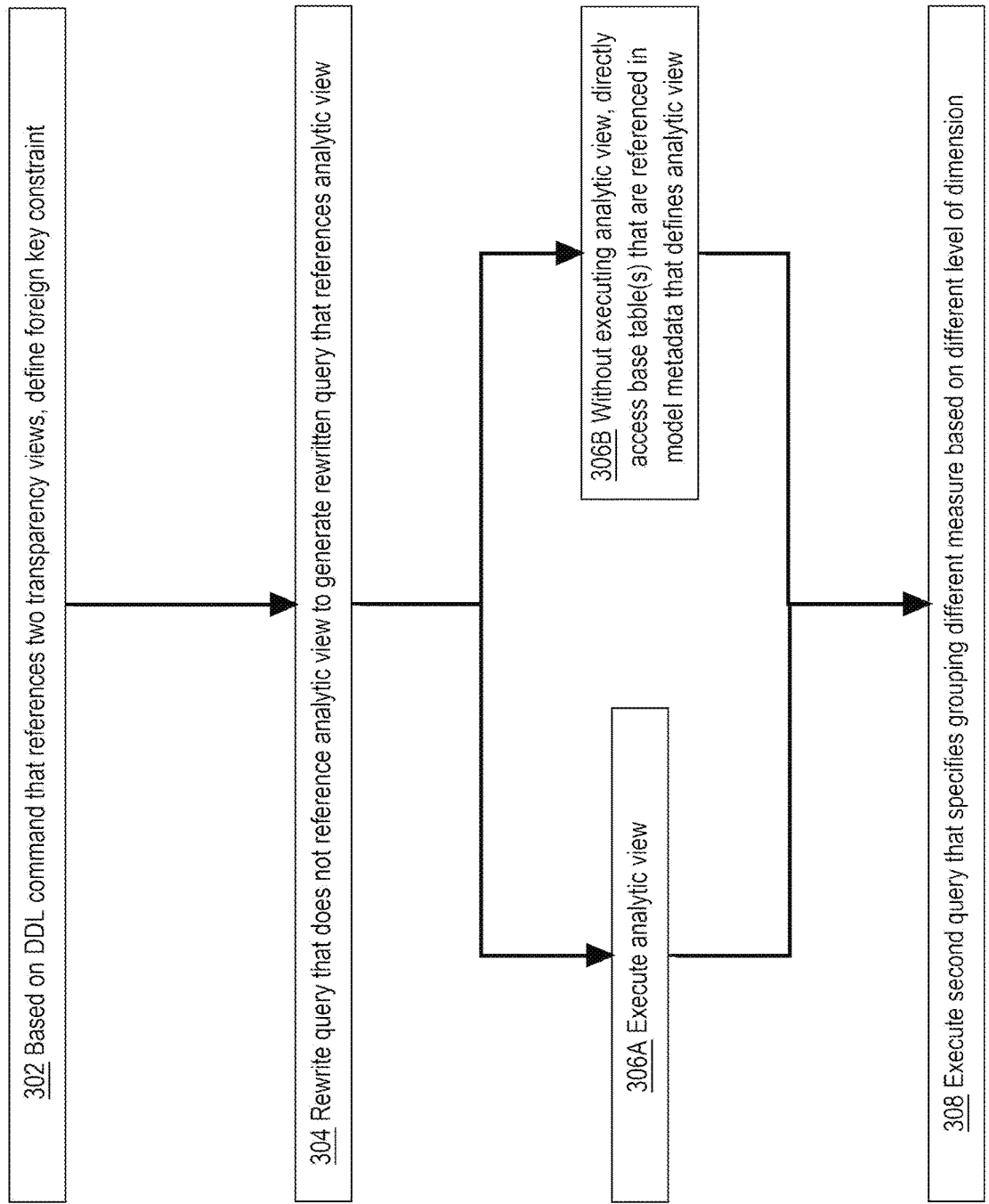
FIG. 3 is a flow diagram that depicts example activities for operation of transparency views and improved execution of a query that references transparency views.

FIG. 3 is a flow diagram that depicts example activities that computer 100 may perform for operation of transparency views 111-112 and improved execution of query 130 that references transparency views 111-112. FIG. 3 is discussed with reference to FIG. 1. The features of the process of FIG. 3 demonstrate design choices, but not requirements, of computer 100.

Step 302 occurs during database administration. Based on a data definition language (DDL) command that references transparency views 111-112, step 302 defines a foreign key constraint between transparency views 111-112, which may be stored in a database dictionary. For example if: a) transparency view 111 is a fact transparency view that is based on fact table 170, and b) transparency view 112 is a dimension transparency view that is based on dimension 122, then c) a foreign key constraint may be defined to ensure that each value of join column 176 of fact table 170 occurs as a value of level 126 of dimension 122.

In an embodiment, step 302 invokes the following DDL constraint script that creates transparency views 111-112 and analytic view 140 that contains join operation 156 between join column 176 of fact table 170 and dimension column 166. In the following DDL constraint script, both columns 166 and 176 are named "month_id". Depending on the embodiment, defining join operation 156 in model metadata 145 of analytic view 140 does or does not also define a corresponding foreign key constraint. In any case, the following DDL constraint script invoking stored procedure add_fk_for_fact_rows ( ) can create that foreign key constraint. For example even if analytic view 140 lacked join operation 156, add_fk_for_fact_rows ( )can create that foreign key constraint. Depending on the embodiment, that foreign key constraint is enforced always or only when transparency view 111 or 112 is executed.

```
CREATE OR REPLACE ANALYTIC VIEW sales_av
USING sales_fact
DIMENSION BY
    (TIME
        KEY month_id REFERENCES month_id
        HIERARCHIES (
            time_hier DEFAULT)
        )
MEASURES
    (sum_sales FACT sales)
FACT COLUMNS (sales);
create_view_for_star_rows(
'SALES_AV', 'TIME', 'PRICE_COST_TIME_STAR_ROWS_VIEW');
create_view_for_fact_rows(
    'SALES_AV','PRICE_COST_FACT_ROWS_VIEW',
    dbms_hierarchy.id2_sequence( ));
add_fk_for_fact_rows('SALES_AV', 'TIME',
'PRICE_COST_FACT_ROWS_VIEW', 'PRICE_COST_TIME_STAR_ROWS_VIEW');
```

3.1 Query Rewriting and View Bypassing

As discussed earlier herein, execution of query 130 may entail analytic view 140 even though query 130 does not reference analytic view 140. Computer 100 may decide to rewrite query 130 after detecting conditions such as according to analysis of any of: transparency view 112, denormalization metadata 117, analytic view 140, model metadata 145, measures 151-152, operations 156 and 158, dimensions 121-122, and tables 161-162 and 170. Step 304 rewrites query 130 that does not reference analytic view 140 to generate a rewritten query that references analytic view 140 for acceleration. Depending on the scenario, some or all references to components of transparency views 111-112 in query 130 are rewritten to bypass transparency views 111-112 and instead reference components of analytic view 140. Rewriting criteria and techniques for analytic views are presented in related U.S. patent application Ser. No. 17/027,238, METHOD FOR USING A SEMANTIC MODEL TO TRANSFORM SQL AGAINST A RELATIONAL TABLE TO ENABLE PERFORMANCE IMPROVEMENTS.

As discussed earlier herein, even though query 130 references transparency views 111-112, execution of query 130 may or may not bypass some or all components of views 111-112 and/or 140. Depending on the scenario, query execution steps 306A-B may be mutually exclusive, such that only one occurs, or cooperative such that steps 306A-B respectively occur for different portions of query 130. Step 306A executes analytic view 140, either to provide data for execution of transparency views 111-112 or to bypass transparency views 111-112 for acceleration.

Without executing analytic view 140, step 306B may directly access base table(s) that are referenced in model metadata 145 that defines analytic view 140. Herein, a base table is any relational table, such as 161-162 and 170, that provides data to analytic view 140 according to model metadata 145. For example and based on view metadata 116-117 and/or 145, execution of query 130 may bypass views 111-112 and/or 140 to directly access any of tables 161-162 and 170 for acceleration. In one example, view metadata 116-117 and 145 provide schematic details that are sufficient to execute query 130 that references transparency views 111-112 that are based on analytic view 140 without executing views 111-112 and 140. Some view metadata may facilitate bypassing views when executing portions of query 130 and, with sufficient view metadata, execution of query 130 may entirely bypass all views and instead execute directly against base tables in an optimal way for acceleration.

3.2 Reusing Same Measure at Different Levels of Same Dimension

As explained earlier herein and regardless of whether or not views are bypassed, a calculation in model metadata 145 that defines analytic view 140, such as measure 151 or 152, is reusable and may be reapplied to different levels of a same dimension for same or different queries. Likewise, different levels of a same dimension may be used for grouping by different queries. For example, a query may: a) specify grouping at one level of a dimension, and b) reference a calculation that is based on a different level of the same dimension. In another example, different queries may: a) specify grouping at different respective levels of a same dimension, and b) reference a same or different respective calculation that is based on the respective grouping level.

As explained earlier herein, measures 151-152 may be reusable across levels 126-127 of dimension 122 and defined by a DDL CREATE statement for analytic view 140 that contains the following MEASURES clause.

```
MEASURES
  (sum_sales FACT sales,
    sales_year_ago AS (LAG(sum_sales) OVER (HIERARCHY
      time_hier OFFSET 1 ACROSS ANCESTOR AT LEVEL year))
```

Also as explained earlier herein, base table columns such as 166-167, 174, and 176 may be indirectly available to query 130 as aliases in transparency views 111-112. For example measure column 174 may be aliased as "sales" in the above MEASURES clause, which is an alias in analytic view 140 that may be further aliased in transparency views 111-112 for access by query 130. In other words, query 130 may be a legacy query that, according to standard SQL, uses column aliases as if they were columns.

Based on view metadata 116-117 and/or 145, computer 100 may invoke a measure even though query 130 invokes an alias of a column instead of an alias of a measure. For example, query 130 may invoke SUM(sales), which may be accelerated by executing measure "sum_sales" as defined in the above MEASURES clause. In that case, it does not matter whether or not transparency views 111-112 provide an alias for sum_sales; nor does it matter whether or not query 130 references that measure alias.

However as follows and unlike column aliases, measure aliases lack SQL compatibility for direct access. According to standard SQL, a legacy client tool may mistakenly use a measure alias as a column alias, which may be illegal in some or all contexts. For example due to grouping operation 135 of query 130, such as a SQL GROUP BY clause, how a column or column alias is processed may depend on whether or not the column or column alias is referenced in the GROUP BY clause.

For example, if columns 174 and 176 are respectively named A-B, and fact table 170 is named C, then query 130 may invoke similarly named aliases such as with "SELECT B FROM C GROUP BY B". Whereas "SELECT A, B FROM C GROUP BY B" is illegal, but "SELECT SUM(A), B FROM C GROUP BY B" is legal. Columns A-B are differently treated because B occurs in the GROUP BY clause, and A does not.

In that case, column alias A should be used within an aggregate function such as SUM( ) which is straightforward for a column or column alias because SUM( ) has desired arithmetic semantics. Whereas semantics of SUM( ) are inappropriate for above measure sum_sales, because measure sum_sales already has summation without query 130 specifying summation. A technical problem is that standard SQL has no aggregate function for projecting a measure that is not included in the GROUP BY clause. That is, a legacy tool cannot detect that a measure alias already represents an aggregate and need not be wrapped in an aggregate function by query 130. Indeed, standard SQL has no support for measures.

Although standard SQL lacks measures, transparency views 111-112 may provide standard SQL compliant access to aliased measures in a novel way as follows. Herein, AV_AGGREGATE( ) is a novel aggregate function that accepts a measure alias as a sole argument and signals to a legacy client tool that value aggregation occurs. Thus, SQL projection clauses "SELECT SUM(A)" and "SELECT AV_AGGREGATE (sum_sales)" are logically equivalent.

When "SELECT SUM(A)" and "SELECT AV_AGGREGATE (sum_sales)" are equivalent, additional query execution optimizations may or may not become available by query 130 expressly referencing measure alias sum_sales. However, query 130 expressly referencing other measure alias sales_year_ago in the above MEASURES clause may provide beneficial encapsulation of a complex calculation because measure sales_year_ago is defined as "(LAG(sum_sales) OVER (HIERARCHY time_hier OFFSET 1 ACROSS ANCESTOR AT LEVEL year))".

There are various benefits to query 130 expressly referencing measure alias sales_year_ago as follows:

1. A complex calculation is centrally encapsulated within a database so that diverse clients may share a correct calculation to avoid client mistakes and diverse and decentralized maintenance.
2. A measure may delegate to other measure(s) for additional encapsulation. For example, measure sales_year_ago is based on measure sum_sales, which further avoids decentralized maintenance.
3. Result caching and other acceleration data structures may be associated with a measure, which may be automatically and dynamically implemented or reused during optimization or rewriting of query 130.
4. Such optimizations may be automatically and statically discovered and implemented such as before query 130 is received such as automatically during administration or database system startup.
5. The measure may be defined such as with the above MEASURES clause to reference a relative level of a dimension such as with the ANCESTOR keyword above or reference an absolute level such as with the LEVEL keyword above, or both such as above. An equivalent calculation without a measure may need reformulation for each possible dimension level of reuse. Thus, a complex measure may actually represent multiple similar alternative calculations for respective levels.

Optimization according to above benefits (3)-(4) may be based on automatic inspection and analysis of view metadata 116-117 and/or 145. Above benefit (5) facilitates reuse of a measure calculation by different queries that use the same measure at different respective levels of a same dimension. For example, the following example query X against transparency views "t" and "f" provides yearly totals for year-on-year comparison of a current year to the prior year based on measure measure_sales_year_ago.

```
SELECT
    t.year_name AS time,
    SUM(f.fact_sales) AS sales,
    AV_AGGREGATE(f.measure_sales_year_ago) AS sales_year_ago
FROM
    sales_av_time_view t,
    sales_av_fact_view f
WHERE
    t.month_id = f.time_month_id
GROUP BY
    t.year_name
ORDER BY
    t.year_end_date;
```

Likewise, the same measure measure_sales_year_ago is reused by the following somewhat similar example query Y that instead provides quarterly subtotals for year-on-year comparison of a current year to the prior year. At least the GROUP BY clause differs between queries X-Y.

```
SELECT
    t.quarter_name AS time,
    SUM(f.fact_sales) AS sales,
    AV_AGGREGATE(f.measure_sales_year_ago) AS sales_year_ago
```
-continued
```
FROM
    sales_av_time_view t,
    sales_av_fact_view f
WHERE
    t.month_id = f.time_month_id
GROUP BY
    t.quarter_name
ORDER BY
    t.quarter_end_date;
```

Without a measure and AV_AGGREGATE( ), it would be difficult or almost impossible for example queries X-Y to share a same calculation formula. Despite such a technical hurdle and especially due to lack of measures in standard SQL, example queries X-Y nonetheless may share a same calculation, a same optimization strategy and, to some extent, may also share cached calculated quantities. For example, query Y may execute first and calculate and cache quarterly subtotals. Likewise, query X may execute last and calculate yearly totals by summing cached quarterly subtotals. In ways such as that, rolling up or drilling down may be accelerated for online analytical processing (OLAP) such as based on analysis of view metadata 116-117 and 145.

In other examples, any level of a same dimension may be referenced by different queries for a same or different measure. For example, a first query may specify grouping by a level of a dimension and reference a measure for calculation based on that level. Likewise in step 308, a second query may specify grouping by a same or different particular level of that same dimension and reference a same or different measure for calculation based on that particular level. In the many above ways, calculations, measures, levels, and dimensions are: a) interrelated and highly reusable, and b) available to analytic view execution or by inspection of analytic view metadata. Combination of aspects (a)-(b) makes calculations, measures, levels, and dimensions highly suitable for optimizations such as memory caching and query acceleration. Various optimizations and accelerations for analytic views are discussed in related U.S. patent application Ser. No. 17/027,238, METHOD FOR USING A SEMANTIC MODEL TO TRANSFORM SQL AGAINST A RELATIONAL TABLE TO ENABLE PERFORMANCE IMPROVEMENTS.

4.0 Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

4.1 Metadata Definitions

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the database dictionary. Metadata that defines an analytic view may be available as stored in the database dictionary. The metadata for the analytic view in the database dictionary is referred when determining whether and how to rewrite a query to access the analytic view and whether the rewrite applies or does not apply base table transform.

4.2 Database Operation

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, such as Oracle Database 11$g$. SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, such as with shared access to a set of disk drives and data blocks stored thereon. The nodes in a multi-node database system may be in the form of a group of computers, such as work stations and/or personal computers, that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

4.3 Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

4.4 Query Optimization Overview

Query transformation is a set of techniques used by an optimizer to rewrite a query for optimization. A query rewrite technique may rewrite a representation of a query from one form to another form as long as the two forms are semantically equivalent to each other. The representation of the query may be the query expression or code itself or may be an internally and/or externally recognized representation of the query, such as a query execution tree or other data structure. If the representation does not include the query expression itself, the representation may include data that describes processes that may be performed to execute the query, such as a query execution plan (QEP). A QEP is a set of directives and metadata that is prepared for an execution engine.

As used herein, a query representation is "rewritten" when the representation represents a rewritten version of the query, after the query has been rewritten from a first version to a second version. A first version may be an original query or may be another version rewritten from the original query.

Two query representations are semantically equivalent to each other when the two query representations, if executed, would produce equivalent result sets, even if the result sets are assembled in different manners by the two query representations.

4.5 Query Optimization and Execution Plans

When a database server receives the original statement of a database command, the database server must first determine which actions should be performed to execute the database command, and then perform those actions. The act of preparing for performance of those actions is generally referred to as "compiling" the database command, while performing those actions is generally referred to as "executing" the database command. During the compilation of a query statement, the database server may perform a significant amount of preliminary work for the statement, such as parsing, semantic analysis, and execution plan generation.

A database command submitted to a database server goes through a query compilation phase where the database command is parsed and optimized. Query optimization selects an optimal execution plan which is then passed on to a query execution engine as a query execution plan to be executed during runtime.

Query optimization generates one or more different candidate execution plans for a database command, which are evaluated by the query optimizer to determine which execution plan should be used to compute the query.

Execution plans may be represented by a graph of interlinked nodes, referred to herein as operators or row sources, that each corresponds to a step of an execution plan, referred to herein as an execution plan operation. The hierarchy of the graphs (i.e., directed tree) represents the order in which the execution plan operations are performed and how data flows between each of the execution plan operations. An execution plan operator generates a set of rows (which may be referred to as a table) as output and execution plan operations include, for example, a table scan, an index scan, sort-merge join, nested-loop join, filter, a full outer join, and importantly, a partial group by operator.

A query optimizer may optimize a database command by transforming the database command. In general, transforming a data command involves rewriting a database command into another semantically equivalent database command that should produce the equivalent result and that can potentially be executed more efficiently, i.e. one for which a potentially more efficient and less costly execution plan can be generated. Examples of query transformations include view merging, subquery unnesting, predicate move-around and pushdown, common subexpression elimination, outer-to-inner join conversion, materialized view rewrite, and star transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
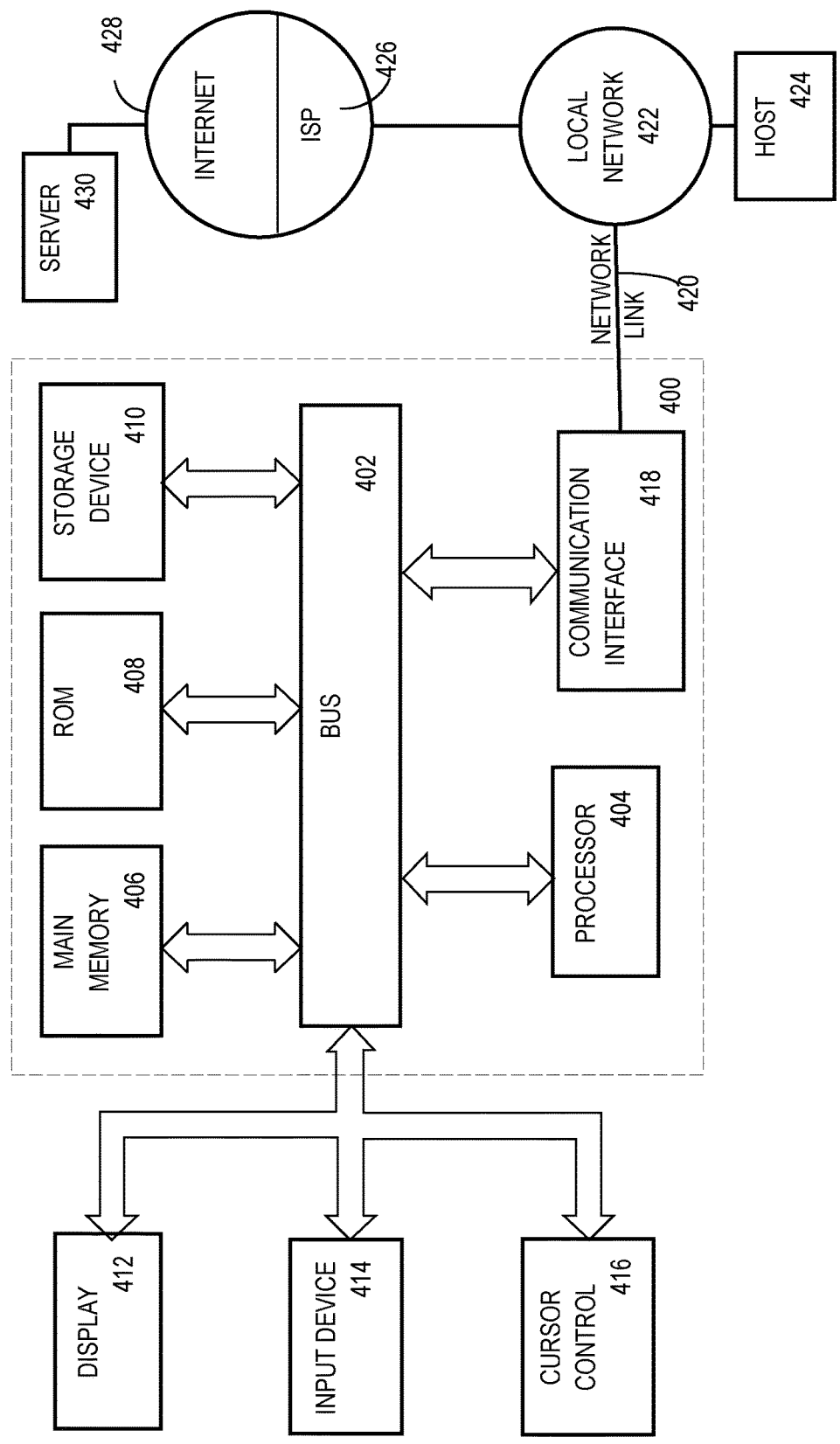
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
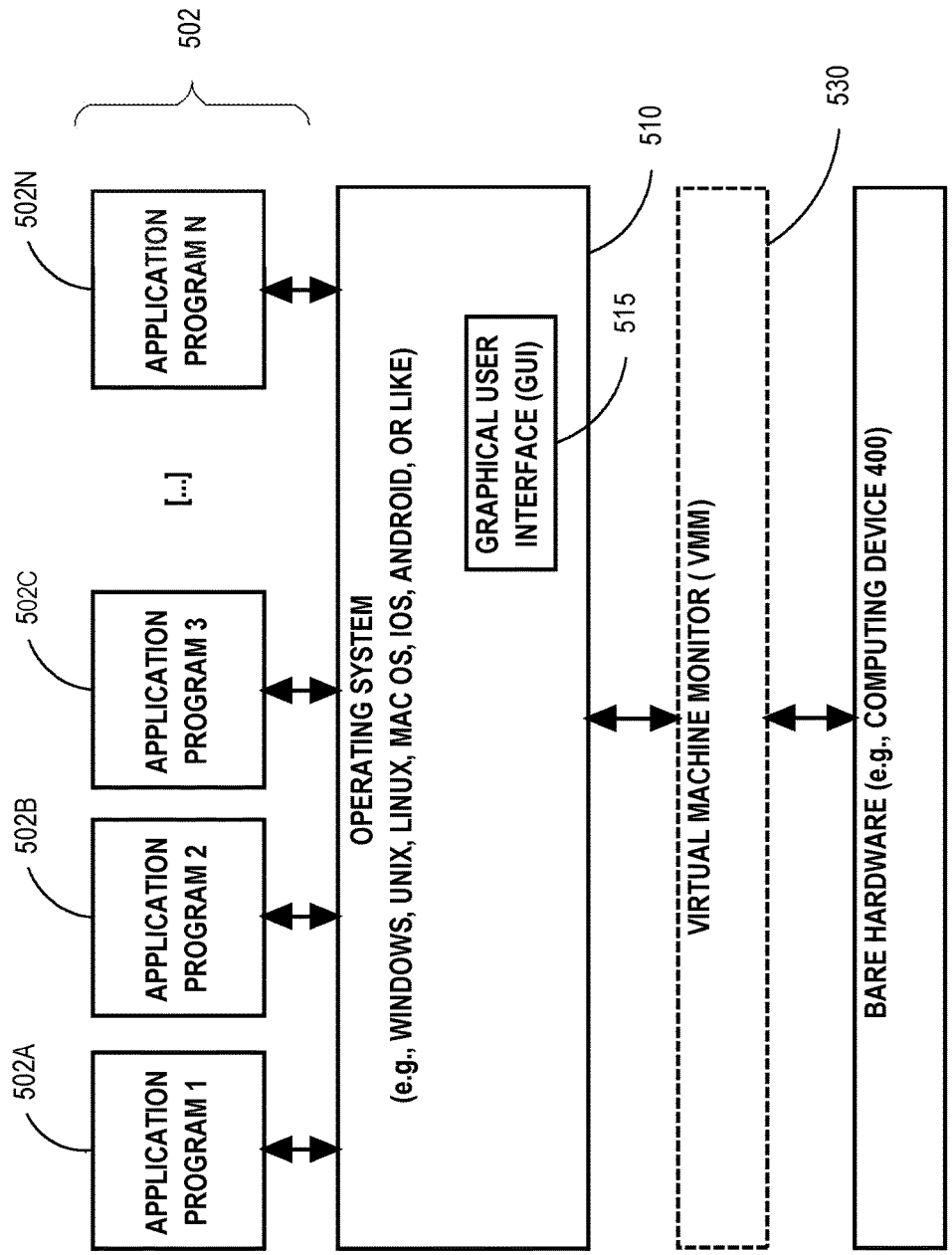
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing model metadata that defines an analytic view that contains:
      a join operation that is based on a dimension column of a dimension table and a join column of a fact table, and
      a measure that is based on an aggregation operation and a measure column of said fact table;
   executing a data definition language (DDL) statement that creates a transparency view, wherein the DDL statement references said analytic view;
   storing denormalization metadata that defines the transparency view, wherein the denormalization metadata is based on said analytic view;
   receiving a query that references said transparency view, wherein said query does not reference said analytic view;
   executing said query that references said transparency view based on:
      said denormalization metadata that defines said transparency view,
      said model metadata that defines said analytic view, and
      said measure that is based on said aggregation operation and said measure column of said fact table.

2. The method of claim 1 wherein:
   said dimension table contains a plurality of dimension columns that correspond to a plurality of respective levels of a dimension that includes a first particular level and a second particular level;
   the plurality of dimension columns contains said dimension column;
   said dimension column corresponds to said first particular level of said dimension;
   said query contains a grouping operation that is based on said second particular level of said dimension.

3. The method of claim 1 wherein:
   said dimension table contains a plurality of dimension columns that correspond to a plurality of respective levels of a dimension that includes a first particular level and a second particular level;
   the plurality of dimension columns contains said dimension column;
   said dimension column corresponds to said first particular level of said dimension;
   said analytic view further contains a second measure that is based on said measure and said second particular level of said dimension;

said query further references said second measure that is based on said second particular level of said dimension.

4. The method of claim 3 wherein said query specifies grouping said second measure based on said first particular level of said dimension.

5. The method of claim 4 further comprising executing a second query that specifies grouping said second measure based on a third particular level of said plurality of respective levels of said dimension.

6. The method of claim 1 wherein:
said model metadata that defines said analytic view is based on:
a first dimension that is based on said dimension table, and
a second dimension that is based on a second dimension table;
said transparency view is further based on said first dimension;
the method further comprises storing second denormalization metadata that defines a second transparency view that is based on said second dimension.

7. The method of claim 1 wherein:
said model metadata that defines said analytic view contains a dimension that is based on said dimension table;
said denormalization metadata further defines a second transparency view that is based on said dimension;
said transparency view is further based on said measure;
the method further comprises defining, based on a data definition language (DDL) command that references said transparency view and said second transparency view, a foreign key constraint.

8. The method of claim 1 wherein said transparency view is not based on a dimension nor a dimension table.

9. The method of claim 1 wherein said transparency view is not based on a measure nor a fact table.

10. The method of claim 1 wherein said executing said query that references said transparency view based on said model metadata that defines said analytic view comprises operating said analytic view.

11. The method of claim 10 wherein said operating said analytic view comprises rewriting said query that does not reference said analytic view to generate a rewritten query that references said analytic view.

12. The method of claim 1 wherein said executing said query that references said transparency view based on said model metadata that defines said analytic view comprises directly accessing, without operating said analytic view, one or more base tables that are referenced in said model metadata that defines said analytic view.

13. One or more computer-readable non-transitory media storing instructions that, when executed by one or more processors, cause:
storing model metadata that defines an analytic view that contains:
a join operation that is based on a dimension column of a dimension table and a join column of a fact table, and
a measure that is based on an aggregation operation and a measure column of said fact table;
executing a data definition language (DDL) statement that creates a transparency view, wherein the DDL statement references said analytic view;
storing denormalization metadata that defines the transparency view, wherein the denormalization metadata is based on said analytic view;
receiving a query that references said transparency view, wherein said query does not reference said analytic view;
executing said query that references said transparency view based on:
said denormalization metadata that defines said transparency view,
said model metadata that defines said analytic view, and
said measure that is based on said aggregation operation and said measure column of said fact table.

14. The one or more computer-readable non-transitory media of claim 13 wherein:
said dimension table contains a plurality of dimension columns that correspond to a plurality of respective levels of a dimension that includes a first particular level and a second particular level;
the plurality of dimension columns contains said dimension column;
said dimension column corresponds to said first particular level of said dimension;
said query contains a grouping operation that is based on said second particular level of said dimension.

15. The one or more computer-readable non-transitory media of claim 13 wherein:
said dimension table contains a plurality of dimension columns that correspond to a plurality of respective levels of a dimension that includes a first particular level and a second particular level;
the plurality of dimension columns contains said dimension column;
said dimension column corresponds to said first particular level of said dimension;
said analytic view further contains a second measure that is based on said measure and said second particular level of said dimension;
said query further references said second measure that is based on said second particular level of said dimension.

16. The one or more computer-readable non-transitory media of claim 13 wherein:
said model metadata that defines said analytic view is based on:
a first dimension that is based on said dimension table, and
a second dimension that is based on a second dimension table;
said transparency view is further based on said first dimension;
the instructions further cause storing second denormalization metadata that defines a second transparency view that is based on said second dimension.

17. The one or more computer-readable non-transitory media of claim 13 wherein:
said model metadata that defines said analytic view contains a dimension that is based on said dimension table;
said denormalization metadata further defines a second transparency view that is based on said dimension;
said transparency view is further based on said measure;
the instructions further cause defining, based on a data definition language (DDL) command that references said transparency view and said second transparency view, a foreign key constraint.

18. The one or more computer-readable non-transitory media of claim 13 wherein said transparency view is not based on a dimension nor a dimension table.

19. The one or more computer-readable non-transitory media of claim 13 wherein said transparency view is not based on a measure nor a fact table.

20. The one or more computer-readable non-transitory media of claim 13 wherein said executing said query that references said transparency view based on said model metadata that defines said analytic view comprises directly accessing, without operating said analytic view, one or more base tables that are referenced in said model metadata that defines said analytic view.

21. The one or more computer-readable non-transitory media of claim 13 wherein said executing said query that references said transparency view based on said model metadata that defines said analytic view comprises operating said analytic view.

22. The one or more computer-readable non-transitory media of claim 21 wherein said operating said analytic view comprises rewriting said query that does not reference said analytic view to generate a rewritten query that references said analytic view.

* * * * *

UNITED STATES PATENT AND TRADEMARK OFFICE
CERTIFICATE OF CORRECTION

| | | |
|---|---|---|
| PATENT NO. | : 11,556,533 B2 | Page 1 of 1 |
| APPLICATION NO. | : 17/096082 | |
| DATED | : January 17, 2023 | |
| INVENTOR(S) | : Hartsing et al. | |

It is certified that error appears in the above-identified patent and that said Letters Patent is hereby corrected as shown below:

In the Specification

In Column 18, Line 43, delete "SUM( )" and insert -- SUM( ), --, therefor.

Signed and Sealed this
Twenty-fourth Day of October, 2023

Katherine Kelly Vidal
*Director of the United States Patent and Trademark Office*